(12) United States Patent
Schurig et al.

(10) Patent No.: US 9,024,503 B2
(45) Date of Patent: May 5, 2015

(54) ELECTRICAL MACHINE WITH FITTING SLEEVE

(75) Inventors: Dieter Schurig, Wallrabenstein (DE); Erdogan Dikmenli, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 13/061,289

(22) PCT Filed: Aug. 25, 2009

(86) PCT No.: PCT/EP2009/060893
§ 371 (c)(1),
(2), (4) Date: May 13, 2011

(87) PCT Pub. No.: WO2010/023190
PCT Pub. Date: Mar. 4, 2010

(65) Prior Publication Data
US 2011/0248599 A1   Oct. 13, 2011

(30) Foreign Application Priority Data

Aug. 28, 2008   (DE) ........................ 10 2008 041 650

(51) Int. Cl.
*H02K 5/14*     (2006.01)
*H02K 9/28*     (2006.01)
*H02K 9/06*     (2006.01)

(52) U.S. Cl.
CPC ... *H02K 9/28* (2013.01); *H02K 9/06* (2013.01)

(58) Field of Classification Search
CPC ............ H02K 9/28; H02K 5/14; H02K 5/16; H02K 5/163

USPC ......................................... 310/227, 228, 232
IPC ................................................ H02K 9/28,5/14
See application file for complete search history.

(56) References Cited

U.S. PATENT DOCUMENTS

| | | | |
|---|---|---|---|
| 2,451,219 A | | 10/1948 | Holmgren |
| 2,706,260 A | * | 4/1955 | Heintz Ralph M ........... 310/227 |
| 4,476,410 A | * | 10/1984 | Wolcott ......................... 310/228 |
| 5,625,244 A | | 4/1997 | Bradfield |
| 6,285,100 B1 | * | 9/2001 | Pflueger et al. ............. 310/68 D |

(Continued)

FOREIGN PATENT DOCUMENTS

| | | |
|---|---|---|
| AT | 335007 | 2/1977 |
| AT | 335007 B | 2/1977 |

(Continued)

OTHER PUBLICATIONS

PCT/EP2009/060893 International Search Report.

*Primary Examiner* — Michael Andrews
(74) *Attorney, Agent, or Firm* — Michael Best & Friedrich LLP (57) ABSTRACT

Electrical machine, in particular AC generator, having a stator (16) and a rotor (20), wherein the rotor (20) has a conductor arrangement for exciting an electromagnetic field, having a device for transmitting electrical energy to the conductor arrangement, wherein the device for transmitting electrical energy comprises at least one sliding contact and at least one mating contact (66) which is fixed to the rotor, having a fitting sleeve (63) in which a roller bearing (28) for supporting a shaft (27) is preferably arranged, said shaft for the most part encasing the at least one mating contact (66) which is fixed to the rotor, wherein a fan (70) is arranged in the fitting sleeve (63).

20 Claims, 5 Drawing Sheets

(56) References Cited

U.S. PATENT DOCUMENTS

| | | | |
|---|---|---|---|
| 7,224,093 B2 * | 5/2007 | Abadia et al. | 310/68 B |
| 2005/0265643 A1 * | 12/2005 | Diaz Alsina et al. | 384/493 |

FOREIGN PATENT DOCUMENTS

| | | | |
|---|---|---|---|
| DE | 19820855 | 7/1999 | |
| DE | 19820885 A1 | 11/1999 | |
| DE | 10155221 | 5/2003 | |
| DE | 10155221 A1 | 5/2003 | |
| GB | 545805 | 12/1942 | |
| GB | 549805 * | 12/1942 | H02K 9/28 |
| GB | 549805 A | 12/1942 | |
| JP | 4161039 | 6/1992 | |
| JP | 4161039 A | 6/1992 | |
| WO | 03/079517 | 9/2003 | |
| WO | 2010/023190 A1 | 3/2010 | |

* cited by examiner

ELECTRICAL MACHINE WITH FITTING SLEEVE

BACKGROUND OF THE INVENTION

The German laid-open specification DE 19705228 A1 has disclosed an AC generator which has an arrangement comprising a rotor and a stator, it being possible for the rotor to be energized by its field coil by means of a slipring arrangement at the right-hand end of the shaft. Carbon brushes slide on this slipring arrangement. In order to protect against external environmental influences, this slipring assembly is protected from the ingress of water (for example cleaning of the motor of the motor vehicle by means of a high-pressure cleaner) by means of a fitting sleeve. Secondly, it is desirable for eroded material from the carbon brushes which necessarily occurs during operation to be removed from this fitting sleeve.

U.S. Pat. No. 5,625,244 has disclosed an arrangement which produces a draught of air through a corresponding fitting sleeve by means of one of the fans which cool the stator windings. The disadvantages of this are that the efficiency is only unsatisfactory and, in addition, longitudinal slots introduced into the bearing section influence the bearing arrangement of the entire electrical machine.

SUMMARY OF THE INVENTION

The object is therefore to provide a technical solution for forced ventilation of an area in which eroded carbon material is produced.

The invention has the advantage that particularly effective production of an air flow or flushing air flow in the fitting sleeve results by virtue of the arrangement of a fan in the fitting sleeve. With the aid of this particularly intensive flushing air flow, it is possible to remove the abraded dust from the carbon brushes from the slipring area in a particularly effective manner. In addition to transporting the carbon dust or abraded dust away, this system also achieves a reduction in temperature in the slipring area. With this temperature reduction of approximately 10° C., the life of the brushes can be extended by over 10%.

The arrangement of fan blades which protrude on a fan plate of the fan provides the possibility of configuring a fan which has a tolerable degree of loading with respect to centrifugal forces through the fans, very particularly in the hub region. If a plate region is arranged axially opposite the free ends of the fan blades and is part of the fitting sleeve, this considerably improves the fan efficiency. Outlet openings arranged radially outside the fan for the flushing air in the fitting sleeve result in the flushing air and the dust particles carried along with it being discharged particularly effectively. If the fan has an outer diameter which is less than the greatest diameter of a roller bearing arranged in the fitting sleeve, this results in a comparatively simple configuration of the fitting sleeve since, as a result, the use of so-called cross slides when the fitting sleeve is produced by casting can be avoided at this point. Provision is made for the fan to be centered by a shaft section and/or by a section of an insulator, the insulator bearing the at least one mating contact fixed to the rotor. This arrangement enables simple centering of the fan on the rotor shaft. In order not to have to design the fan to be too solid, very particularly in the hub region thereof, provision is made for a sleeve section to be integrally formed on a radial inner edge of the fan and to bear against the insulator.

In accordance with a further configuration of the invention, provision is made for the fan to shield the roller bearing from contamination with its fan plate. Furthermore, provision is made for the fitting sleeve to have an opening which enables flushing air to enter. This opening can be arranged, for example, in a side region of the fitting sleeve or end region or transition region between the sides and end region (that end of the fitting sleeve which is remote from the roller bearing). Furthermore, this opening can also be a gap, which is produced in an opening in the fitting sleeve by virtue of the cartridge of the brushholder being inserted into this opening and this gap enables a draught of air. In order to avoid slip between the fan and the rotor shaft, provision is made for this fan to be secured on the rotor by means of a cohesive connection (by adhesive bonding, friction welding) or a form-fitting or force-fitting connection.

DETAILED DESCRIPTION

Figure 1:
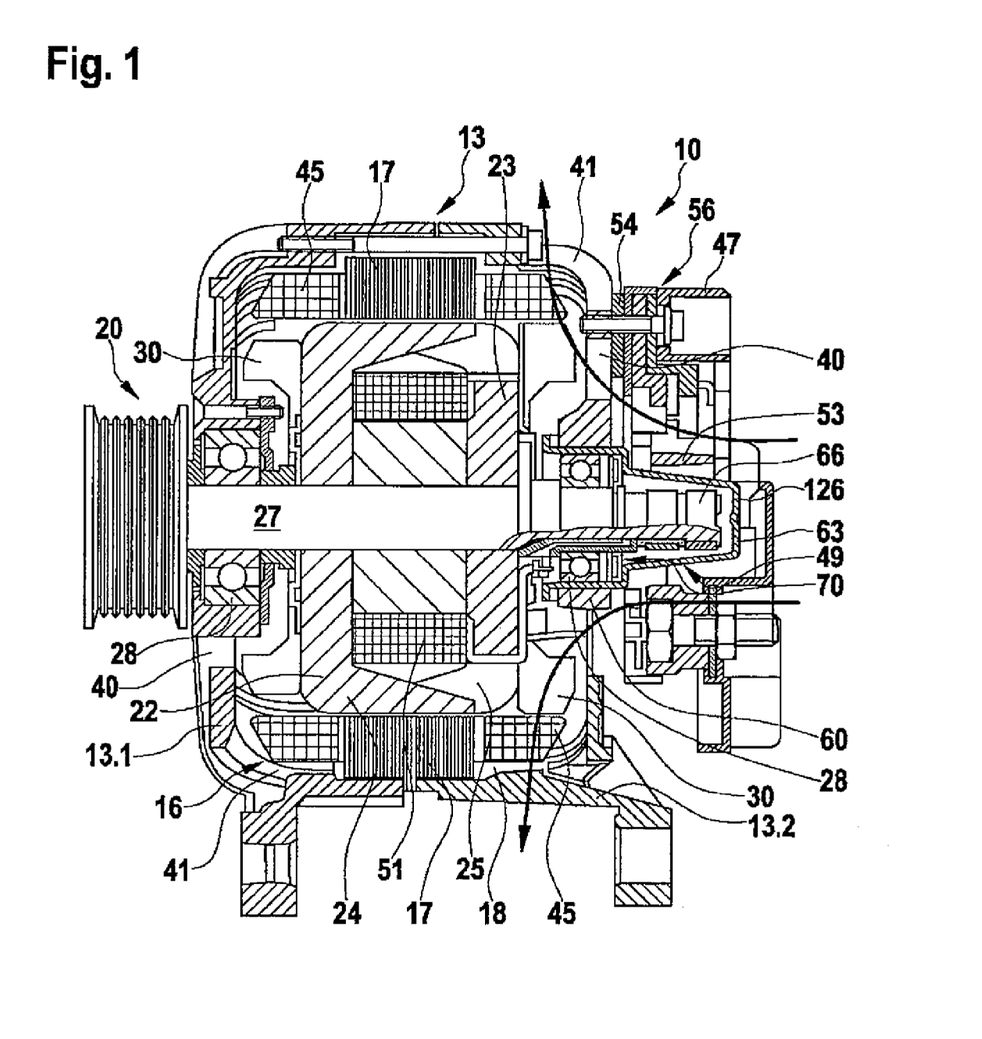
FIG. 1 shows a longitudinal section through an electrical machine, in this case in the form of an AC generator.

FIG. 1 illustrates a cross section through an electrical machine 10, in this case in the form of a generator or AC generator for motor vehicles. This electrical machine 10 has, inter alia, a two-part housing 13, which consists of a first end plate 13.1 and a second end plate 13.2. The end plate 13.1 and the end plate 13.2 contain a so-called stator 16, which firstly consists of a stator core 17 which is substantially in the form of a circular ring and has a stator winding 18 inserted into the radially inwardly directed, axially extending slots of said stator. The radially inwardly directed slotted surface of this ring-shaped stator 16 surrounds a rotor 20, which is in the form of a claw-pole rotor. The rotor 20 consists, inter alia, of two claw-pole boards 22 and 23, with in each case axially extending claw-pole fingers 24 and 25 being arranged on the outer circumference of said claw-pole boards. The two claw-pole boards 22 and 23 are arranged in the rotor 20 in such a way that the axially extending claw-pole fingers 24 and 25 thereof alternate with one another on the circumference of the rotor 20. This results in magnetically required interspaces between the claw-pole fingers 24 and 25, which have opposite magnetization, said interspaces being referred to as claw-pole interspaces. The rotor 20 is mounted rotatably in the respective end plates 13.1 and 13.2 by means of a shaft 27 and in each case one roller bearing 28 located on each rotor side.

The rotor 20 has in total two axial end faces, on which in each case one fan 30 is fastened. This fan 30 consists substantially of a plate-shaped or disk-shaped section, from which fan blades emerge in a known manner. These fans 30 are used for enabling air interchange between the outer side of the electrical machine 10 and the interior of the electrical machine 10 via openings 40 in the end plates 13.1 and 13.2. For this purpose, the openings 40 are provided substantially at the axial ends of the end plates 13.1 and 13.2, via which cooling air is sucked into the interior of the electrical machine 10 by means of the fans 30. This cooling air is accelerated radially outward by the rotation of the fans 30, with the result that said cooling air can pass through the winding overhang 45 through which cooling air can pass. As a result of this effect, the winding overhang 45 is cooled. Once it has passed through the winding overhang 45 or once it has flowed around this winding overhang 45, the cooling air takes a path radially outward, through openings 41 illustrated in this case in FIG. 1.

On the right-hand side in FIG. 1, there is a protective cap 47, which protects various component parts from environmental influences. For example, this protective cap 47 covers a so-called slipring assembly 49, for example, which slipring assembly serves the purpose of supplying field current to a field winding 51. A heat sink 53, which acts here as the plus heat sink, is arranged around the slipring assembly 49. A plate 54 acts as the so-called minus heat sink. A connecting terminal plate 56, which serves the purpose of connecting minus diodes arranged in the plate 54 and plus diodes (not shown in this illustration) in the heat sink 53 to one another and therefore of representing a bridge circuit known per se, is arranged on the heat sink 53.

A hub 60, which has a cylindrical inner circumference and therefore a bore, is located in the end plate 13.2, on the radial inner side thereof. A so-called fitting sleeve 63, which has the task of containing the so-called brush-side roller bearing 28, sits in this bore. Details in this regard are explained in more detail in FIG. 2. This fitting sleeve has not only this actual fitting ring section, which is located directly in the hub 60, but also, integrally formed on this fitting ring section, a sleeve-shaped cap, which surrounds mating contacts 66, in this case sliprings, which are fastened on the rotor 20 and are therefore fixed to the rotor. A sliding contact (not illustrated here), which is conventionally also referred to as a brush, conducts on this mating contact 66 fixed to the rotor. Furthermore, a fan 70, which drives flushing air located in the fitting sleeve 63 and thus delivers abraded dust produced during wear on the sliding contacts out of the interior of the fitting sleeve 63, is arranged in said fitting sleeve 63.

Therefore, an electrical machine 10 is shown, in particular an AC generator, with a stator 16 and a rotor 20, wherein the rotor 20 bears a conductor arrangement, in this case in the form of a field winding 51, for exciting an electromagnetic field in the rotor, with a device for transmitting electrical energy to the conductor arrangement, wherein the device for transmitting electrical energy comprises at least one sliding contact in the form of a brush (graphite, carbon brush) and at least one mating contact fixed to the rotor. The mating contact fixed to the rotor is in the form of a slipring in the mentioned exemplary embodiment. Another embodiment may be in the form of a commutator, for example, with laminates distributed over the circumference in the case of a DC machine. Furthermore, the electrical machine 10 has a fitting sleeve 63, in which preferably the mentioned roller bearing 28 is arranged for supporting a shaft 27, said fitting sleeve enveloping a large proportion of the at least one mating contact 66 fixed to the rotor. Provision is made for a fan 70 to be arranged in the fitting sleeve 63.

Figure 2:
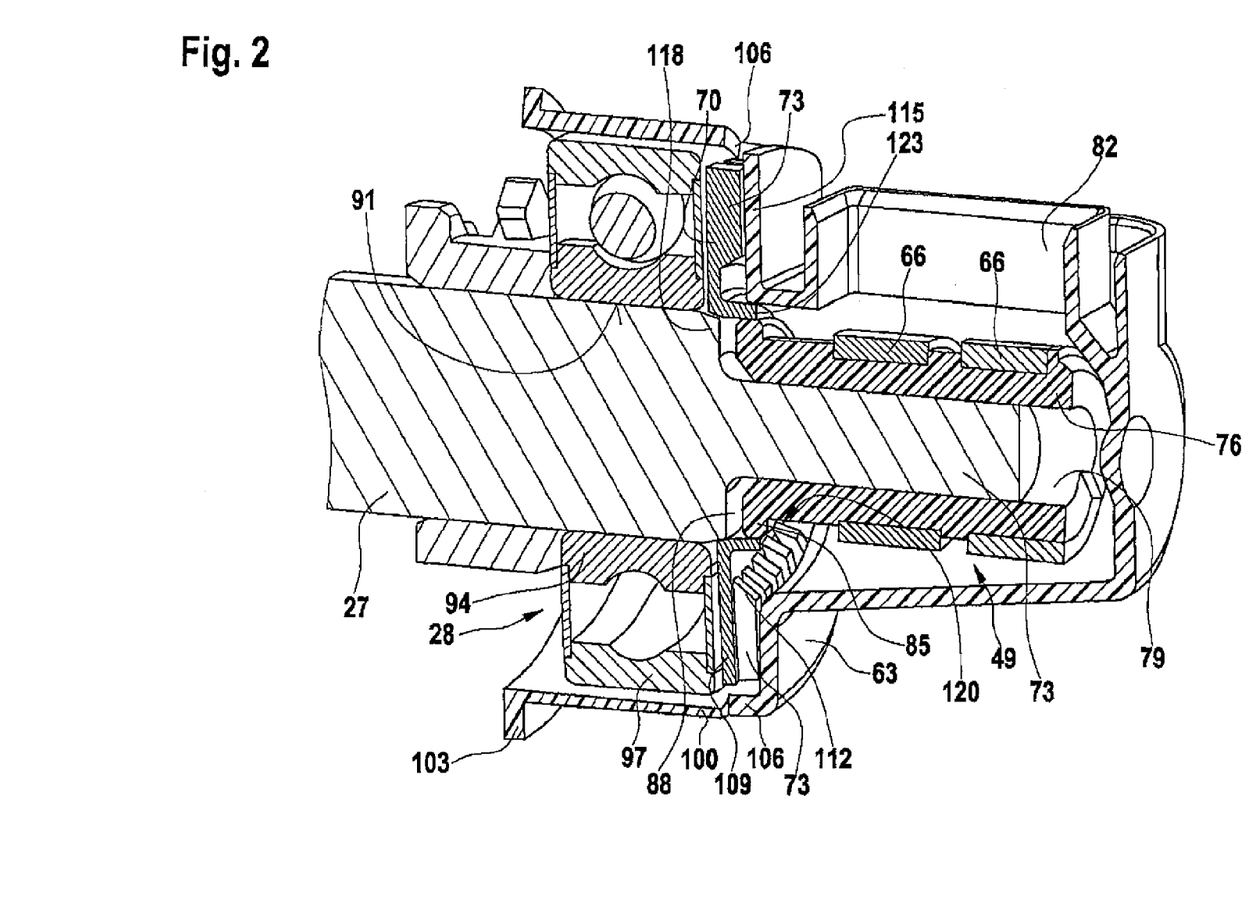
FIG. 2 shows a longitudinal section through the slipring area (first exemplary embodiment)

FIG. 2 illustrates a longitudinal section through the slipring assembly. The figure also shows how this slipring assembly and also the roller bearing 28 are surrounded by the fitting sleeve 63. The shaft 27 has a pin 73 at the end of said shaft which points away from the electromagnetic part of the rotor 20, with a contact section 76 of the slipring assembly 49 being arranged on said pin 73. This contact section 76 has a central bore 79, which rests on the pin 73 at least in a force-fitting manner. The contact section 76, with its insulating plastics material, holds two mating contacts 66 fixed to the rotor which are located radially below an opening 82. This opening 82 is introduced in the fitting ring 63 and serves the purpose of accommodating a cartridge (not illustrated here) of a brushholder in order that corresponding sliding contacts which are arranged in the brushholder or the cartridge thereof can assume contact with the mating contacts 66. In each case one electrical conductor emerges from the mating contacts 66 illustrated here, from the radial inner circumference thereof, and is passed toward the left within the insulator material and below the roller bearing, i.e. radially within the inner ring of the roller bearing, toward the left. The contact section 76 is oriented with a collar section 85, which is oriented toward the electromagnetic part of the rotor 20 on the left in FIG. 2, in the direction toward a bearing face 88 of the shaft 27 and can bear against said bearing face.

The bearing face 88 is adjoined by a shaft section in the direction pointing away from the sliprings 66, said shaft section being configured as a seat 91 for the roller bearing 28. The roller bearing 28 rests with its inner ring 94 on the seat 91; its outer ring 97 is supported on the fitting ring section 100 radially outward and in the hub 60. The fitting ring section 100 is positioned on the end plate 13.2 by means of a collar 103 (see also FIG. 1), from the inside of the end plate 13.2. The fan 70 with its fan blades is arranged between the bearing 28 and the contact section 76. With a radial, possibly even slightly axial offset, outside the fan 70, openings 106 are arranged in the fitting sleeve 63 and are distributed at this point over the entire circumference of the fitting sleeve 63. The fan 70 uses its fan blades 73 to distribute air which it has delivered from the interior of the fitting sleeve 63, through these openings 106 radially outward or substantially virtually radially outward and thus removes eroded dust. The fan blades 73 protrude from a fan plate 109. A plate region 115, which is part of the fitting sleeve 63, is arranged axially opposite free ends 112 of the fan blades 73. This arrangement improves the fan efficiency considerably.

The fan 70 has an outer diameter which is smaller than the largest diameter of the roller bearing 28 arranged in the fitting sleeve 63. The fan 70 uses its fan plate 109 to shield the roller bearing 28 against contamination.

As shown in FIG. 2, the fan 70 is centered by a shaft section 118 and by a section of the insulator, namely the collar section 85, and in this case on the radially outer side thereof. The insulator is in this case the plastics content or plastics region of the contact section 76. Alternatively, the fan 70 could also be centered either only by the shaft section 118 or only by the collar section 85 of the insulator.

A sleeve section 123, which bears on the insulator, i.e. the insulation material of the contact section 76, is integrally formed on the radial inner wall 120 of the fan 70.

Figure 3:
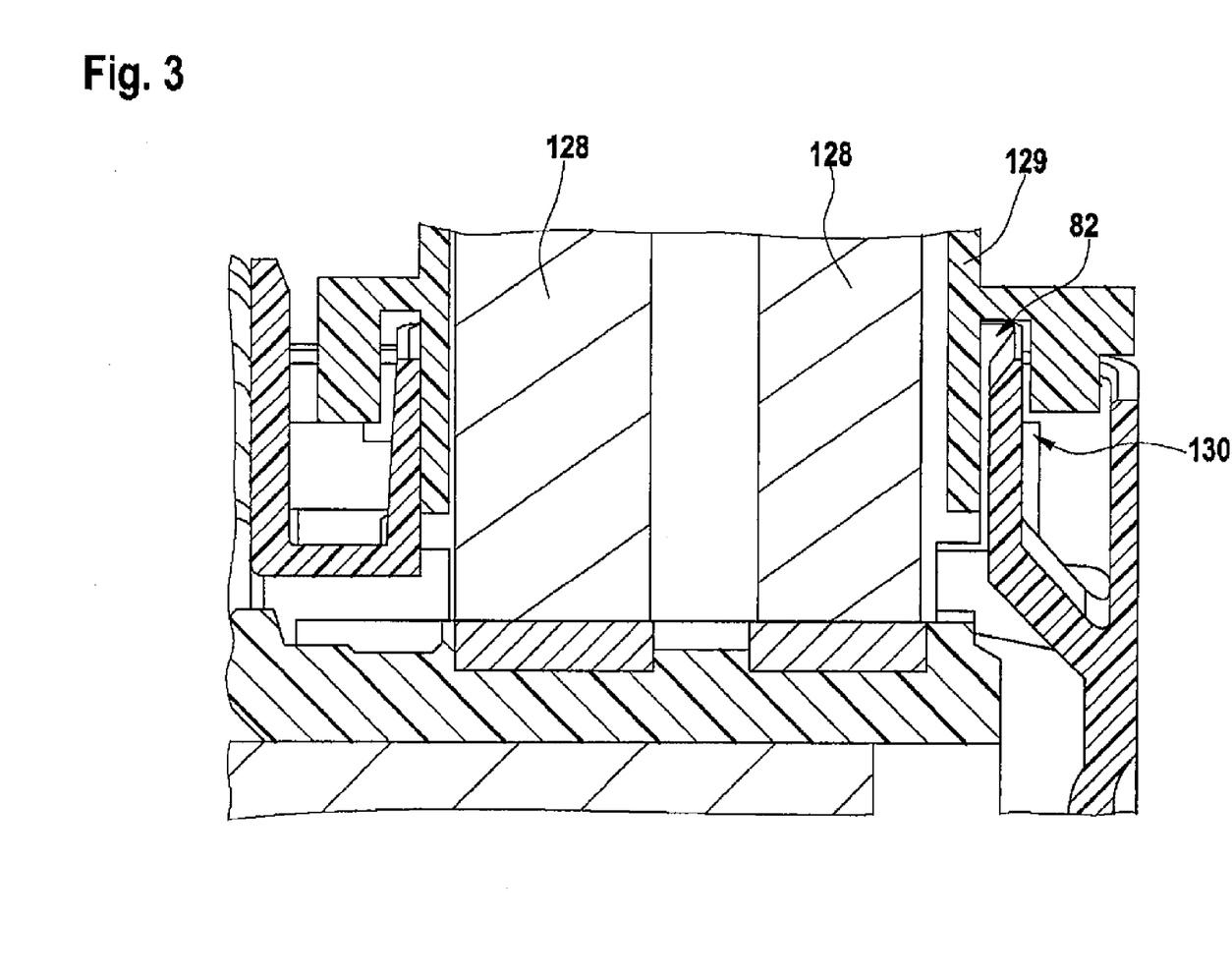
FIG. 3 shows a partial longitudinal section through a fitting labyrinth with a brush cartridge inserted.

The fitting sleeve 63 has an opening 126, which is already illustrated in FIG. 1 and enables flushing air to enter. As an alternative, the opening 82 is provided as an opening which enables flushing air to enter in FIG. 2. Preferably, the cartridge 129 of a brushholder is inserted into this opening 82, wherein a gap which enables flushing air to enter is between the cartridge and the opening 82. The cartridge has the reference numeral 129 in FIG. 3. The brushes 128 protrude into the opening 82. Provision is made for the fan 70 to be secured on the rotor by means of a cohesive, form-fitting or force-fitting connection.

Provision is made for the fan 70 to maintain a certain distance from the roller bearing 28. This is important for removing any liquid that has entered as a result of the centrifugal effect from the interspace. If the distance is too small, the liquid with respect to the ball bearing and the fan cannot be removed or can only be removed with difficulty by the capillary effect. Suitable distances between the ball bearing 28 and the fans 70, acting as centrifugal disk, are >0.3 mm. The distance of the outer blade diameter should be dimensioned such that there is optimum air flow with at the same time a small distance from the inner diameter of the fitting ring 63. This changes the effect of the ingress of liquid in the case of self-rotating generators. Typical distances between the outer diameter, the fan and the inner diameter encapsulation are between 1 and 2 mm. The fan has the task of producing a permanent negative pressure in the slipring area. Cooler air is sucked in through the regulator-fitting ring-labyrinth (gap 130), cools the sliprings in a targeted manner and leaves the slipring area at the openings of the fitting ring. This outlet opening are fitted parallel to the fan outer diameter in order to remove any liquid that has entered as a result of the centrifugal effect immediately out of the encapsulation again. The number of blades should be selected such that a flow rate which is as high as possible is ensured. A typical number of blades is between 6 and 30. The holes in the fitting ring are around the periphery, i.e. arranged over the entire circumference of 360°. Therefore, a discharge of liquid which has entered is ensured in all installed positions. In addition, these openings need to be applied at the greatest outer diameter of the fitting ring. Therefore, complete discharge of liquids is guaranteed.

Figure 4:
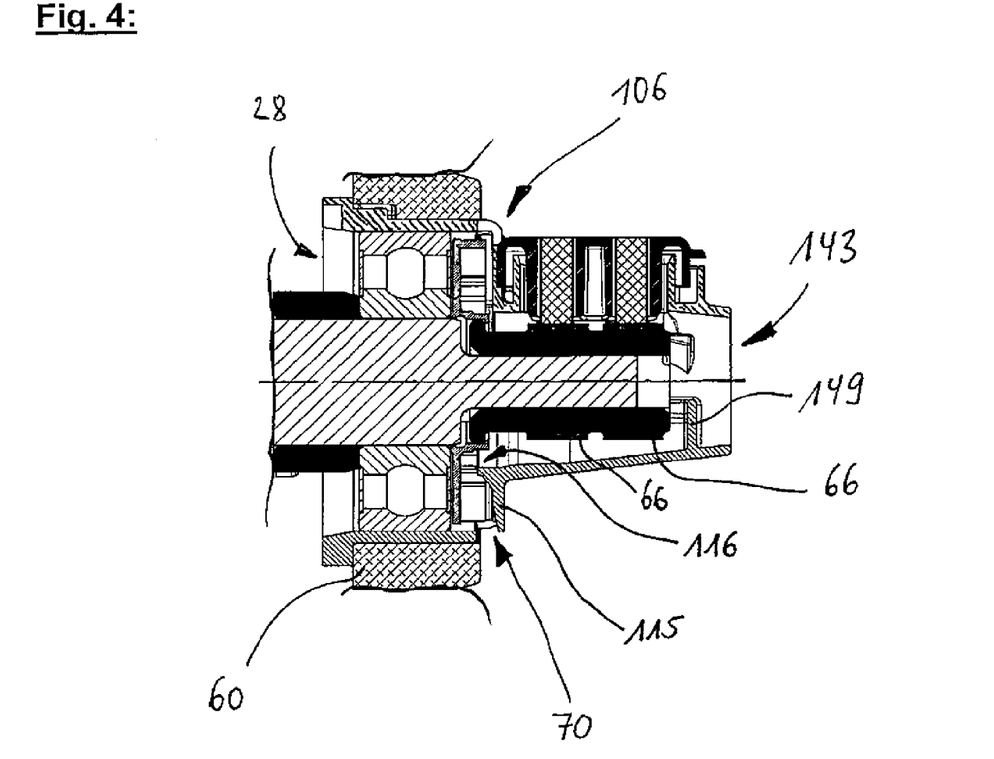
FIG. 4 shows a longitudinal sectional view of a second exemplary embodiment.
Figure 5A:
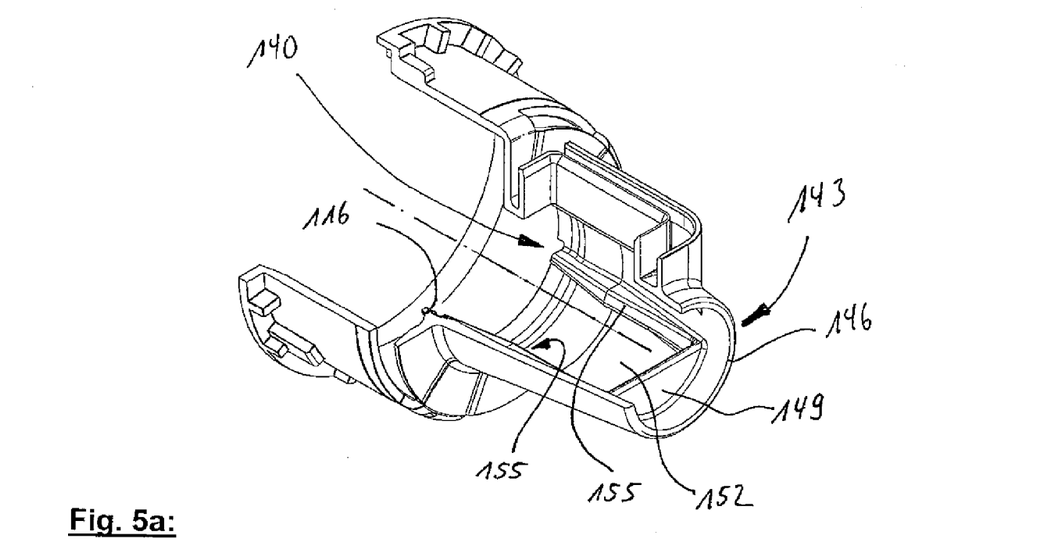
FIG. 5a shows a partial sectional view of the fitting sleeve of the second exemplary embodiment.

As is shown in FIG. 4 in a second exemplary embodiment, the plate region 115 can alternatively also be arranged at a greater distance from the fan blades 73 (greater than in the first exemplary embodiment). In order to achieve a high fan efficiency, provision is preferably made in the case of such a distance for the fitting sleeve 63 to reach, with an end 116 of the sleeve-shaped cap, said end being in the form of a pipe connector and being directed toward the roller bearing 28, axially closer to the fan blades 73 than the distance in the axial direction between the plate region 115 and the fan blades 73. Provision is made for the fitting sleeve 63 to have outlet openings 106 for flushing air which serve the purpose of letting out air delivered by the fan 70, with the outlet openings 106 being arranged either radially outside the fan 70 or axially offset with respect to the fan 70. The end 116 in the form of a pipe connector, in the rest state of the electrical machine, for example, makes it more difficult for liquids to enter through the outlet openings 106. The end 106 in the form of a pipe connector can be both continuously ring-shaped and interrupted at a few points, see also FIG. 5, for example. Said figure shows an interruption 140.

Figure 5B:
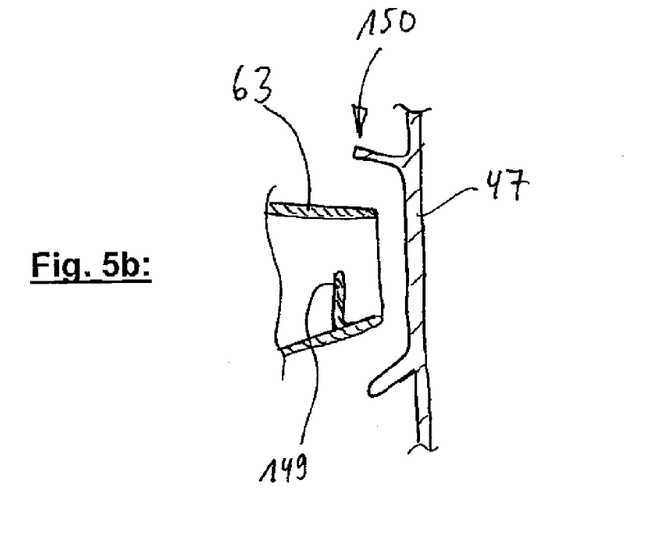
FIG. 5b shows, schematically, how the open end of the fitting sleeve is covered by a region of the protective cap.
Figure 6:
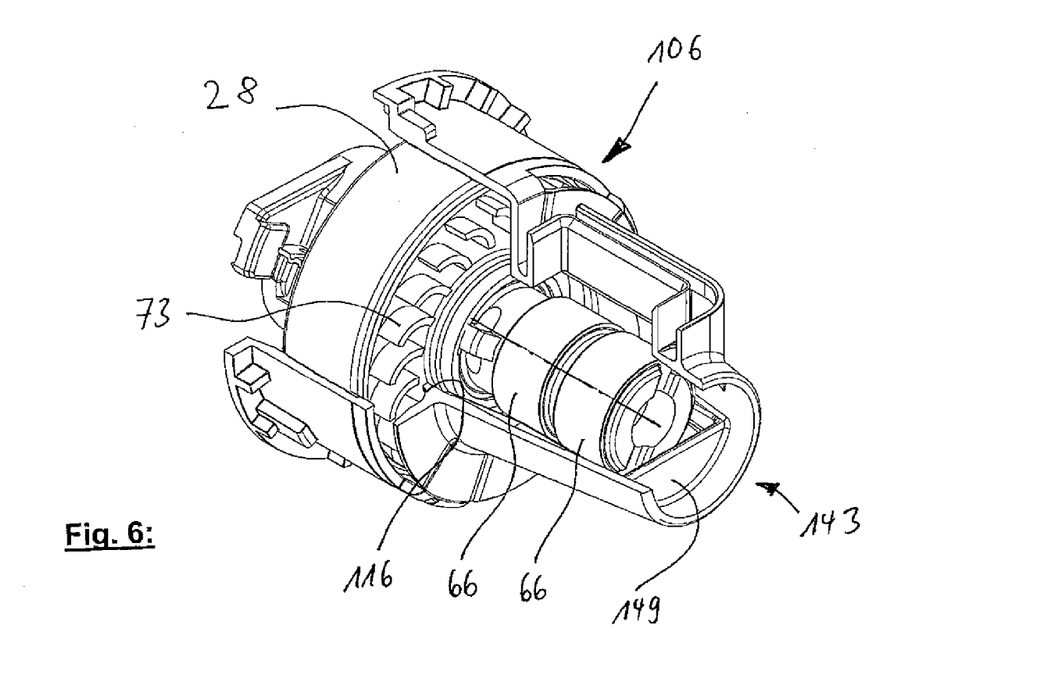
FIG. 6 shows a three-dimensional view into the fitting sleeve shown in FIG. 5 with different component parts arranged therein.

FIG. 5 shows, furthermore, a fitting sleeve 63, in which that end of the cap thereof which is remote from the roller bearing 28 is equipped with an air inlet opening 143. The fitting sleeve 63 which is configured so as to be round in the form of a pipe there, has a barrier-like web 149 slightly after the end 146 of the fitting sleeve 63, i.e. slightly set back from the end 146. This web 149 per se firstly impedes liquids which may enter. Very particularly in interaction with a protective cap 47 (see also FIG. 1) which is arranged with a cup-like or pot-like cap region 150 with a gap over the air inlet opening 143 (FIG. 5b), access for liquids is firstly made more difficult and, at the same time, good ventilation of the fitting sleeve 63 becomes possible.

Two webs 155 extend along an inner wall 152 of the fitting sleeve 63. These two webs 155 have the function of a water separator. If water or another liquid is nevertheless sucked in or sprayed in through the air inlet opening 143, for example, the surface section of the inner wall 152 which is arranged above the web 149 will be covered. Furthermore, the slipring assembly 49 will also be covered, for example, and water will again be centrifuged away by any existing rotation of the slipring assembly 49. The webs 155 serve the purpose of collecting (channeling) water and of allowing droplets to form on these webs 155, it being possible for said droplets thus to be dragged away with the flow or discharged more easily and to an increased extent in the direction toward the fan 70. The residence time of the liquid in the fitting sleeve 63 is thus reduced.

What is claimed is:

1. An electrical machine with a stator (16) and a rotor (20), the rotor (20) bearing a conductor arrangement for exciting an electromagnetic field, with a device for transmitting electrical energy to the conductor arrangement, the device for transmitting electrical energy comprising at least one sliding contact and at least one mating contact (66) fixed to the rotor, with a fitting sleeve (63), said fitting sleeve enveloping a large proportion of the at least one mating contact (66) fixed to the rotor, characterized in that a fan (70) is arranged in the fitting sleeve (63), and in that the fan is centered by a shaft section (118) and/or by a section of an insulator, the insulator bearing the at least one mating contact (66) fixed to the rotor, and characterized in that a sleeve section (123) is integrally formed on a radial inner edge of the fan (70) and bears against the insulator.

2. The electrical machine as in claim 1, wherein the fitting sleeve (63) contains a roller bearing (28) supporting a shaft (27), and wherein the roller bearing (28) is radially supported by a section of the fitting sleeve radially outside of the roller bearing.

3. The electrical machine as claimed in claim 2, wherein the machine also comprises an end plate having a hub defining a bore, and wherein the section of the fitting sleeve sits in the bore between the hub and the roller bearing.

4. The electrical machine as claimed in claim 1, characterized in that the fan (70) has, on a fan plate (109), fan blades (73) protruding from said fan plate.

5. The electrical machine as claimed in claim 4, characterized in that a plate region (115), which is part of the fitting sleeve (63), is arranged axially opposite free ends (112) of the fan blades (73).

6. The electrical machine as claimed in claim 5, characterized in that the fitting sleeve (63) has outlet openings (106) for flushing air which serve the purpose of letting out air which has been delivered from the fan (70), the outlet openings (106) being arranged either radially outside the fan (70) or axially offset with respect to the fan (70).

7. The electrical machine as claimed in claim 6, characterized in that the fitting sleeve (63) includes a sleeve-shaped cap having an end (116), said end being in the form of a pipe connector and being directed toward the roller bearing (28), reaches axially closer to fan blades (73) than an axial distance between a plate region (115) of the fitting sleeve and the fan blades (73).

8. The electrical machine as claimed in claim 7, characterized in that the fan (70) has an outer diameter which is less than the greatest diameter of a roller bearing (28) arranged in the fitting sleeve (63).

9. The electrical machine as claimed in claim 1, characterized in that the fitting sleeve (63) has outlet openings (106) for flushing air which serve the purpose of letting out air which has been delivered from the fan (70), the outlet openings (106) being arranged either radially outside the fan (70) or axially offset with respect to the fan (70).

10. The electrical machine as claimed in claim 9, characterized in that the fitting sleeve (63) includes a sleeve-shaped cap having an end (116), said end being in the form of a pipe connector and being directed toward the roller bearing (28), reaches axially closer to fan blades (73) than an axial distance between a plate region (115) of the fitting sleeve and the fan blades (73).

11. The electrical machine as claimed in claim 1, characterized in that the fan (70) has an outer diameter which is less than the greatest diameter of a roller bearing (28) arranged in the fitting sleeve (63).

12. The electrical machine as claimed in claim 1, characterized in that the fan (70) with a fan plate (109) shields a roller bearing (28) from contamination.

13. The electrical machine as claimed in claim 1, characterized in that the fitting sleeve (63) has an opening (82, 126), which makes it possible for flushing air to enter and into which a cartridge (129) of a brushholder protrudes, wherein a gap (130) which enables flushing air to enter is between the cartridge (129) and the opening (82).

14. The electrical machine as claimed in claim 1, characterized in that the fan (70) is secured on the rotor (20) by means of a cohesive, form-fitting or force-fitting connection.

15. The electrical machine as claimed in claim 1 wherein the machine is an AC generator.

16. An electrical machine, with a stator (16) and a rotor (20), the rotor (20) bearing a conductor arrangement for exciting an electromagnetic field, with a device for transmitting electrical energy to the conductor arrangement, the device for transmitting electrical energy comprising at least one sliding contact and at least one mating contact (66) fixed to the rotor, with a fitting sleeve (63) containing a roller bearing (28) supporting a shaft (27), said fitting sleeve enveloping a large proportion of the at least one mating contact (66) fixed to the rotor, wherein a fan (70) is arranged in the fitting sleeve (63);
  characterized in that the fan (70) has, on a fan plate (109), fan blades (73) protruding from said fan plate;
  characterized in that a plate region (115), which is part of the fitting sleeve (63), is arranged axially opposite free ends (112) of the fan blades (73);
  characterized in that the fitting sleeve (63) has outlet openings (106) for flushing air which serve the purpose of letting out air which has been delivered from the fan (70), the outlet openings (106) being arranged either radially outside the fan (70) or axially offset with respect to the fan (70);
  characterized in that the fitting sleeve (63) includes a sleeve-shaped cap having an end (116), said end being in the form of a pipe connector and being directed toward the roller bearing (28), reaches axially closer to the fan blades (73) than the axial distance between a plate region (115) of the fitting sleeve and the fan blades (73);
  characterized in that the fan (70) has an outer diameter which is less than the greatest diameter of a roller bearing (28) arranged in the fitting sleeve (63);
  characterized in that the fan is centered by a shaft section (118) and/or by a section of an insulator, the insulator bearing the at least one mating contact (66) fixed to the rotor; and
  characterized in that a sleeve section (123) is integrally formed on a radial inner edge of the fan (70) and bears against the insulator.

17. The electrical machine as claimed in claim 16, characterized in that the fan (70) with a fan plate (109) shields a roller bearing (28) from contamination.

18. The electrical machine as claimed in claim 17, characterized in that the fitting sleeve (63) has an opening (82, 126), which makes it possible for flushing air to enter and into which a cartridge (129) of a brushholder protrudes, wherein a gap (130) which enables flushing air to enter is between the cartridge (129) and the opening (82).

19. The electrical machine as claimed in claim 16, wherein the machine also comprises an end plate having a hub defining a bore, and wherein a section of the fitting sleeve sits in the bore between the hub and the roller bearing.

20. The electrical machine as claimed in claim 16, wherein the fan (70) is secured on the rotor (20) by means of a cohesive, form-fitting or force-fitting connection.

\* \* \* \* \*